Sept. 5, 1933.                A. G. BUDD ET AL                1,925,625
       MECHANICAL APPLIANCE FOR REMOVING FEATHERS, STUBS, AND DOWN
           FROM FOWLS, GAME BIRDS, DUCKS, GEESE, OR THE LIKE
                    Filed June 27, 1930           4 Sheets-Sheet 1

INVENTORS
Anthony George Budd
and Hendy Barton
BY B. Singer
ATTORNEY

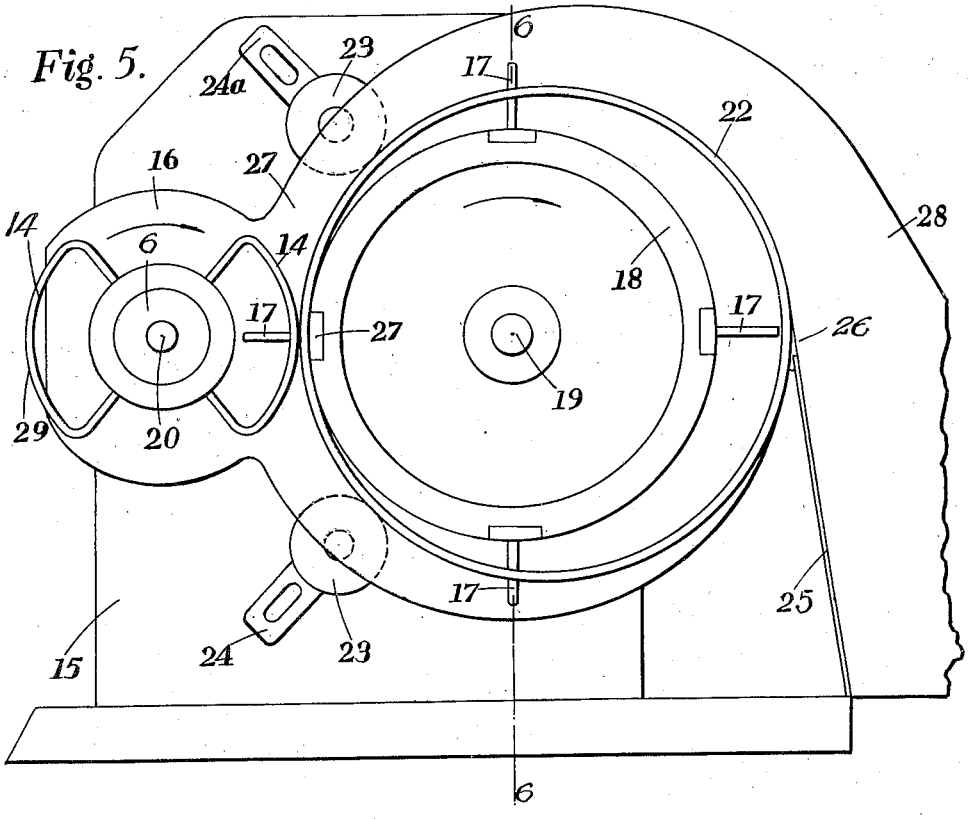
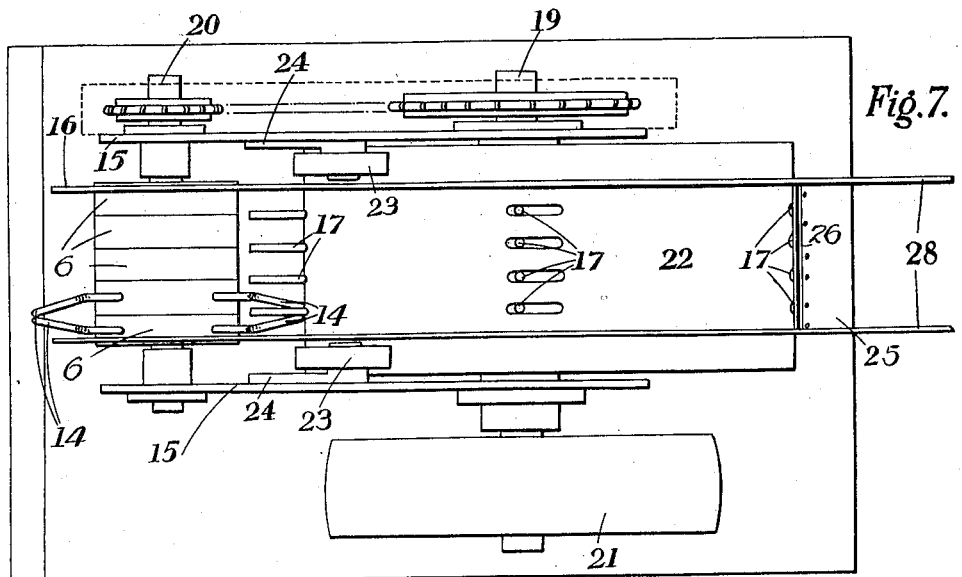

Sept. 5, 1933.  A. G. BUDD ET AL  1,925,625
MECHANICAL APPLIANCE FOR REMOVING FEATHERS, STUBS, AND DOWN
FROM FOWLS, GAME BIRDS, DUCKS, GEESE, OR THE LIKE
Filed June 27, 1930  4 Sheets-Sheet 3
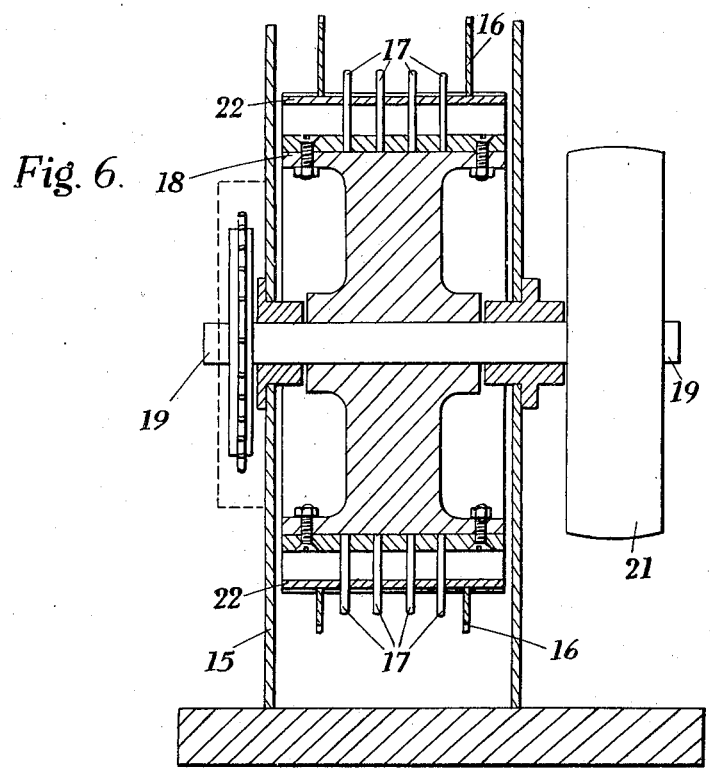

Sept. 5, 1933.         A. G. BUDD ET AL         1,925,625
  MECHANICAL APPLIANCE FOR REMOVING FEATHERS, STUBS, AND DOWN
     FROM FOWLS, GAME BIRDS, DUCKS, GEESE, OR THE LIKE
              Filed June 27, 1930        4 Sheets-Sheet 4

INVENTORS
Anthony George Budd
and Henry Barton
BY
B. Singer
ATTORNEY

Patented Sept. 5, 1933

1,925,625

UNITED STATES PATENT OFFICE 1,925,625

MECHANICAL APPLIANCE FOR REMOVING FEATHERS, STUBS, AND DOWN FROM FOWLS, GAME-BIRDS, DUCKS, GEESE, OR THE LIKE

Anthony George Budd and Henry Barton, West Moors, England

Application June 27, 1930, Serial No. 464,364, and in Great Britain June 29, 1929

10 Claims. (Cl. 17—11)

This invention relates to improvements in or connected with means for removing feathers, down and stubs from poultry and other birds.

According to the present invention we provide one or more rotary elements having a plurality of gripping members so disposed that as said element or elements is or are rotated in correct disposition with respect to the bird to be treated, the feathers, down or stubs are gripped and extracted. We further preferably provide means for clearing the plucked feathers and the like from the gripping members, such means comprising for example a comb or the like adapted to free the gripping members and permit the feathers to drop away or alternatively said clearing means may include mechanical devices such as one or more rotary combs adapted not only to clear the gripping members but also to convey the feathers and the like to a desired discharge orifice.

We may provide any convenient means for collecting the plucked feathers, stubs and down; thus for example any suitable cowling may be disposed around the apparatus and a fan or the like may be provided for drawing the feathers along the desired conduit or conduits. The feathers and the like may be led to or conveyed to such conduit in any suitable manner and collected in any desired receptacles.

Plucking apparatus according to the present invention may be of any desired size or capacity and may be operated by hand or any suitable power; thus for instance the simplest and lightest models may be mounted on a handle through which a flexible drive passes, whilst heavier models may be adapted to be mounted on a bench and may be driven by hand or by any suitable motor.

The aforesaid gripping members are preferably disposed on their carrier in a readily removable manner so that they may be renewed from time to time or so that different sets of gripping members may be used for different operations if desired.

In order that our invention may be well understood, we will now describe by way of example some embodiments thereof with reference to the drawings in which:

Figure 5 is a side elevation of a further modified plucking device in association with a suitable form of clearing device, the side plate of the device being removed.

Figure 6 is a cross-section on the line 6—6 of Figure 5;

Figure 7 is a plan view of the device shown in Figure 5 but with the top plate of the cowling removed.

Figure 1:
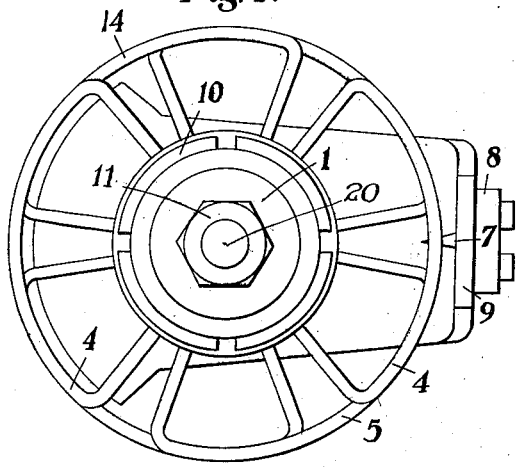
Figure 1 is a plan view of one form of plucking device with the guard removed.
Figure 2:
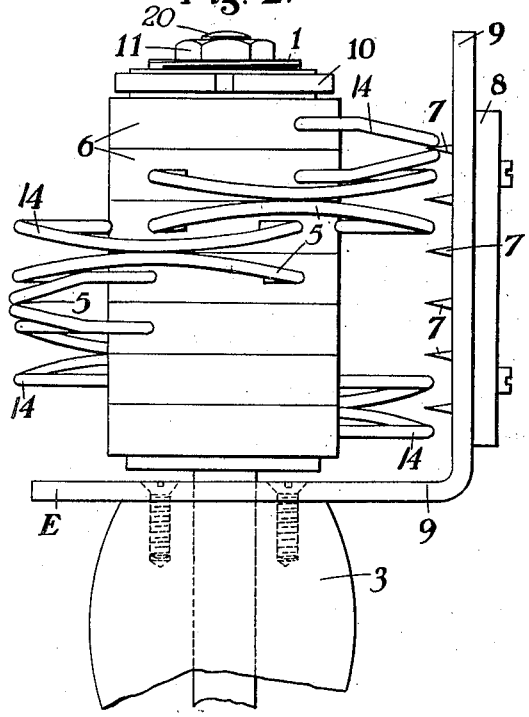
Figure 2 is a side elevation of Figure 1.

Referring to Figures 1 and 2 the plucking device includes a cylinder 1 mounted upon the spindle 20 projecting through the handle 3 and caused to rotate through the medium of a flexible shaft or any suitable mechanism. A plurality of gripping members comprising spring hoops or blades 14 of steel or other suitable material curved so that they contact with each other at the points 5 and secured to the discs or rings 6 are fitted to said cylinder 1 so that they rotate therewith. In Figures 1 and 2 the gripping devices are arranged in the form of a single helix. It is to be observed in this respect that said members may be arranged in the form of a double helix if desired and any desired number of elements 14 may be included; further the points of contact 5 may be located at any desired points other than the mid-points of the hoops; thus such points may be located near the rear ends of the hoops with the object of giving a better lead in for the feathers, stubs and the like.

A plurality of teeth 7 carried on the plate 8 which is secured to the bracket 9 restrained in fixed relationship with respect to the handle 3, are disposed in the track of the gripping members 14. Said bracket 9 may be adapted also to carry a guard hereinafter described with reference to Figures 3 and 4. The discs or rings 6 may be locked on the core 1 by means of the ring nut 10 and the so formed drum may be locked on the spindle 2 by means of the nut 11. The rings 6 may be further locked in correct relative positions by being keyed to the core 1.

Figure 3:
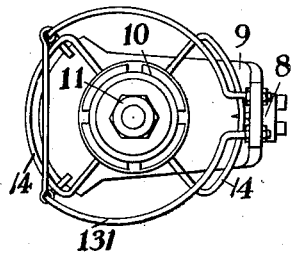
Figure 3 is a plan view of a plucking device with a modified arrangement of gripping members.
Figure 4:
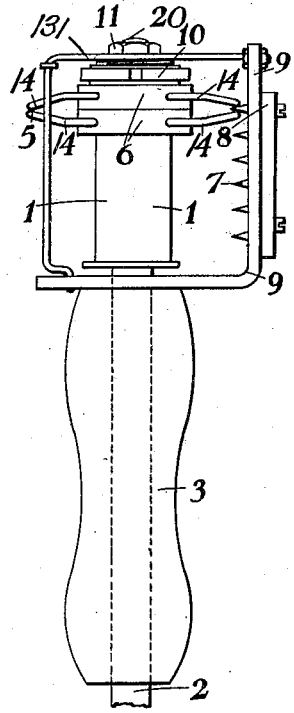
Figure 4 is a side elevation of Figure 3.

Now referring to Figures 3 and 4 in which for the sake of clearness only two pairs of gripping members 14 are shown carried as before by discs 6, a guard 131 is shown secured to the bracket 9. This guard may be made from steel wire or other suitable material and serves the purposes of maintaining the gripping members 14 at the desired distance from the bird to be plucked and of erecting the feathers or stubs so as to facilitate their being gripped by the said gripping members 14.

In operation it is readily apparent that the feathers will enter between the bowed hoops or gripping members 14, and be gripped at their points of contact 5. The plucked feathers will then be carried round in the gripping members until those are freed by the comb teeth 7 entering therebetween.

Now referring to Figures 5, 6 and 7 which show a modified and larger form of plucking apparatus associated with means for clearing and collecting or "bagging" the plucked feathers, stubs and down, the actual plucking device comprises gripping elements 14 secured to discs or rings 6. Said plucking device is mounted between side frames 15 and is enclosed in suitable cowling generally indicated by the numeral 16. In this example the means for clearing the feathers from the gripping members 14 include a plurality of moving combs or projections 17 carried on the drum 18. Said drum 18 is mounted on a spindle 19 which is connected to spindle 20 of the plucking device by chain and sprocket or other suitable transmission gear and caused to rotate in any suitable way; thus for example a belt pulley 21 may be fitted thereto or a handle may be connected to the shaft 19.

Around the drum 18 is located another drum 22 having slots in its periphery through which may project the teeth 17 carried on the drum 18. The drum 22 is kept in contact with the drum 18 at a point adjacent the gripping members 14 by means of guide rollers two of which are shown at 23. There may of course be any desired number of such guiding rollers and these may be arranged in any required way with respect to the drums. Further, provision may be made for readily adjusting such rollers, thus they may be mounted on slotted brackets 24, 24a.

The drum 22 is thus maintained eccentrically with respect to the drum 18, the degree of eccentricity and the length of the pins 17 being such that at a part of the drum 22 remote from the gripping members 14 the pins 17 do not project through said drum 22. At such part of the drum is located a scraper 25 which may consist of a spring-steel plate having a strip of leather 26 contacting with the drum 22.

The aforesaid plucking device and clearing device is enclosed within any suitable cowling opening from the throat 27 into a discharge chute 28. Said chute may communicate directly with bags or containers for the feathers etc. or may communicate with conduits conducting such feathers to any desired location.

In the operation of this apparatus it is apparent that the feathers, stubs and down plucked by the gripping members 14 will be extracted from said members by the revolving teeth or combs 17 and carried around on the surface of the drum 22 towards the throat 27 of the cowling. As said feathers etc. are further carried around on the drum 22 the teeth 17 will gradually recede owing to the eccentricity of the drums 22 and 18 until a smooth surface remains from which the feathers etc. are removed by the scraper 25.

In the example above described the drum 18 is adapted to rotate at half the angular velocity of the plucking device; it is to be observed however that the ratio may be varied to suit any particular requirements such for instance as the number of clearing combs on the drum 22 and that such ratio may be obtained through the medium of any suitable transmission gearing.

It is to be observed that the combs may easily be removed from the cylinder 18 when the projections or teeth 17 are in their retracted positions, and thus facilitate cleaning or changing said combs when required.

Figure 8:
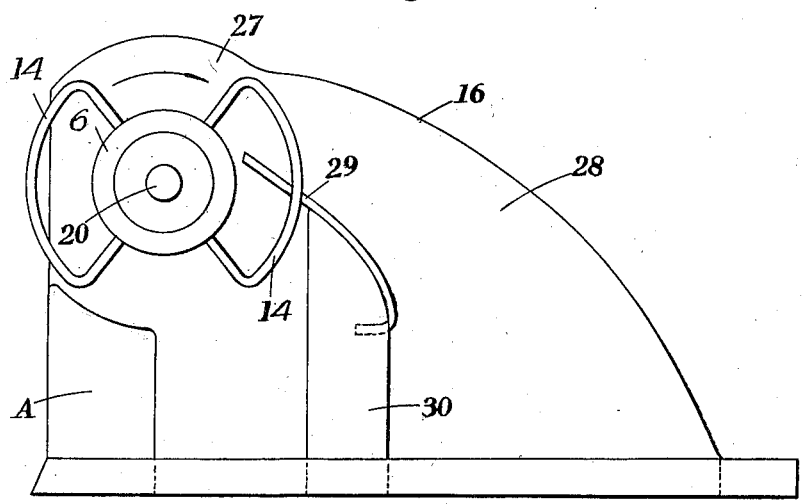
Figure 8 is a side elevation of a simplified plucking and clearing device with the side plate removed.
Figure 9:
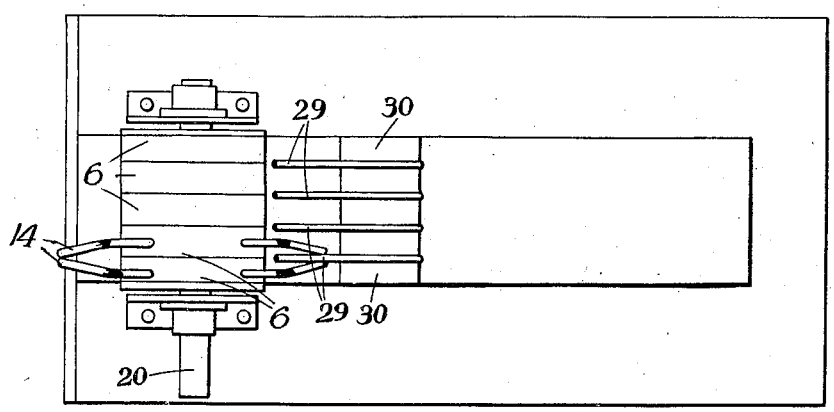
Figure 9 is a plan view thereof with the top plate removed.

Now referring to Figures 8 and 9 which show plucking apparatus according to this invention associated with simplified clearing means. The plucking device itself is similar to those above described but the clearing means comprise a series of teeth or projections 29 having rearwardly and downwardly projecting rear portions which tend to convey the feathers etc. from the throat 27 of the cowling 16 towards the chute 28. The teeth or blades 29, which may be of metal, fibre or other suitable material may be mounted on any convenient bridge or partition member 30 which with the cowling 16 forms a closed conduit or such teeth or blades may be mounted directly below the gripping member, and thereby dispense with the necessity for the bridge member 30 and give a wider discharge for the plucked matter.

If desired a fan or the like may be housed within the cowling enclosing plucking apparatus according to this invention or part of any conduit associated therewith for the purpose of inducing the feathers to travel in the desired direction. In some cases the rotary element of the gripping device may serve the purpose of a blower.

In a modification of the above examples some or all of the gripping members instead of comprising bent wire hoops may comprise spring blades of sheet metal or other suitable material and any desired number of discs, dummy hoops or blades may be provided for the purpose of increasing the drum like surface of the plucking device without necessarily increasing the number of gripping members.

Whilst we have hereinbefore given some preferred embodiments of our invention, we wish it to be understood that the particular details and arrangement of parts may be varied or modified without departing from the scope thereof; thus for example any desired number of gripping or plucking members and clearing devices may be provided and these may be operated by hand or any desired power source, further the plucking apparatus may be used with or without associated clearing and collecting or "bagging" mechanism.

We claim:

1. Means for removing feathers, stubs and down from poultry and other birds including gripping members in the form of spring-like hoops, curved so that they contact with each other at the desired points and so that the matter to be plucked is led to a position between those parts of the members which tend to contact with each other.

2. Means for removing feathers, stubs and down from poultry and other birds comprising resilient members parts of which tend to contact with each other by virtue of the resilient nature of the members, means for causing relative movement between said members and a bird to be treated, means for leading the matter to be plucked between the parts of the members which tend to come together, means for freeing the plucked matter from the gripping members and means for conveying the plucked matter to a discharge conduit, said latter means including a series of arms radiating from a rotatable hub mounted within an eccentric cylinder so that during one part of their revolution said arms project through apertures in the cylinder and enter between the gripping members and in another part of their rotation they recede within the cylinder.

3. Means for removing feathers, stubs and down from poultry and other birds comprising resilient members parts of which tend to contact with each other by virtue of the resilient nature of the members, means for causing relative movement between said members and a bird to be treated, means for leading the matter to be plucked between the parts of the members which tend to come together, means for freeing the plucked matter from the gripping members and means for conveying the plucked matter to a discharge conduit, said latter means including a series of arms radiating from a rotatable hub mounted within an eccentric cylinder so that during one part of their revolution said arms project through apertures in the cylinder and enter between the gripping members and in another part of their rotation they recede within the cylinder and means for scraping the plucked matter from the surface of the cylinder.

4. Means for removing feathers, stubs and down from poultry and other birds comprising a plurality of spring-like hoops mounted on a rotatable hub, said hoops being curved so that parts thereof tend to contact with each other and provide a lead-in for the feathers to said parts which are urged together, a series of blades, one for each pair of hoops, located in the paths of said hoops for separating said hoops at desired intervals and a guard against which to hold a bird in correct position for treatment by the plucking means.

5. Means for removing feathers, stubs and down from poultry and other birds comprising a plurality of curved hoops of a resilient nature mounted for rotation upon a hub, means for rotating said hub, means for correctly locating a bird to be plucked with respect to the rotary hoops, means for leading the feathers, stubs and down between pairs of said hoops and positioning such matter between parts of the hoops which tend to come together by reason of the resilient nature thereof, blades for separating said parts of the gripping members in order to free the plucked matter and means for conveying said matter to a discharge conduit.

6. Means for removing feathers, stubs and down from poultry and other birds including a plurality of spring-like hoops, curved in order to tend to contact with each other in pairs and to lead the matter to be plucked between the parts tending to come together, means for rotating the spring-like hoops in order to pluck the gripped matter and means for separating said hoops to free the plucked matter.

7. Means for removing feathers, stubs and down from poultry and other birds, comprising a rotatable hub, a plurality of resilient gripping members detachably secured to said hub, each pair of gripping members including parts which tend to contact with each other by reason of their resilient nature and shape, means for leading the matter to be plucked between said parts of the members which tend to come together and members located in the paths of said pairs of resilient gripping members and arranged to separate said members at desired intervals.

8. Means for removing feathers, stubs and down from poultry and other birds, comprising a rotary drum assembly including gripping members which are of a resilient nature and curved so that they tend to contact together in pairs by reason of said shape and natural resiliency, and separating blades located in the paths of said gripping members for forcing them apart at desired intervals and permitting them to come together again with a snap action under the influence of the natural resiliency of said members.

9. Means for removing feathers, stubs and down from poultry and other birds, comprising resilient gripping members, parts of which are so curved that they tend to contact with each other by virtue of their own spring-like nature, means for rotating said members, means for leading the matter to be plucked between those parts of the gripping members which naturally tend to come together, means for forcing apart said parts of the gripping members in order to free the plucked matter and mechanical means for discharging the plucked matter from the gripping members.

10. Means for removing feathers, stubs and down from poultry and other birds, including gripping members carrying blades of a spring-like nature, parts of said blades tending to contact with each other solely by reason of their natural springiness and shape, and separating blades located in the paths of said members for forcing them apart and permitting them to snap together again at desired intervals.

ANTHONY GEORGE BUDD.
HENRY BARTON.